May 14, 1957
R. E. SCOTT ET AL
2,792,568
NETWORK FOR DETECTING THE FAILURE OF THE INSULATION
OF ELECTRICALLY CONDUCTIVE CABLES
Filed March 4, 1955
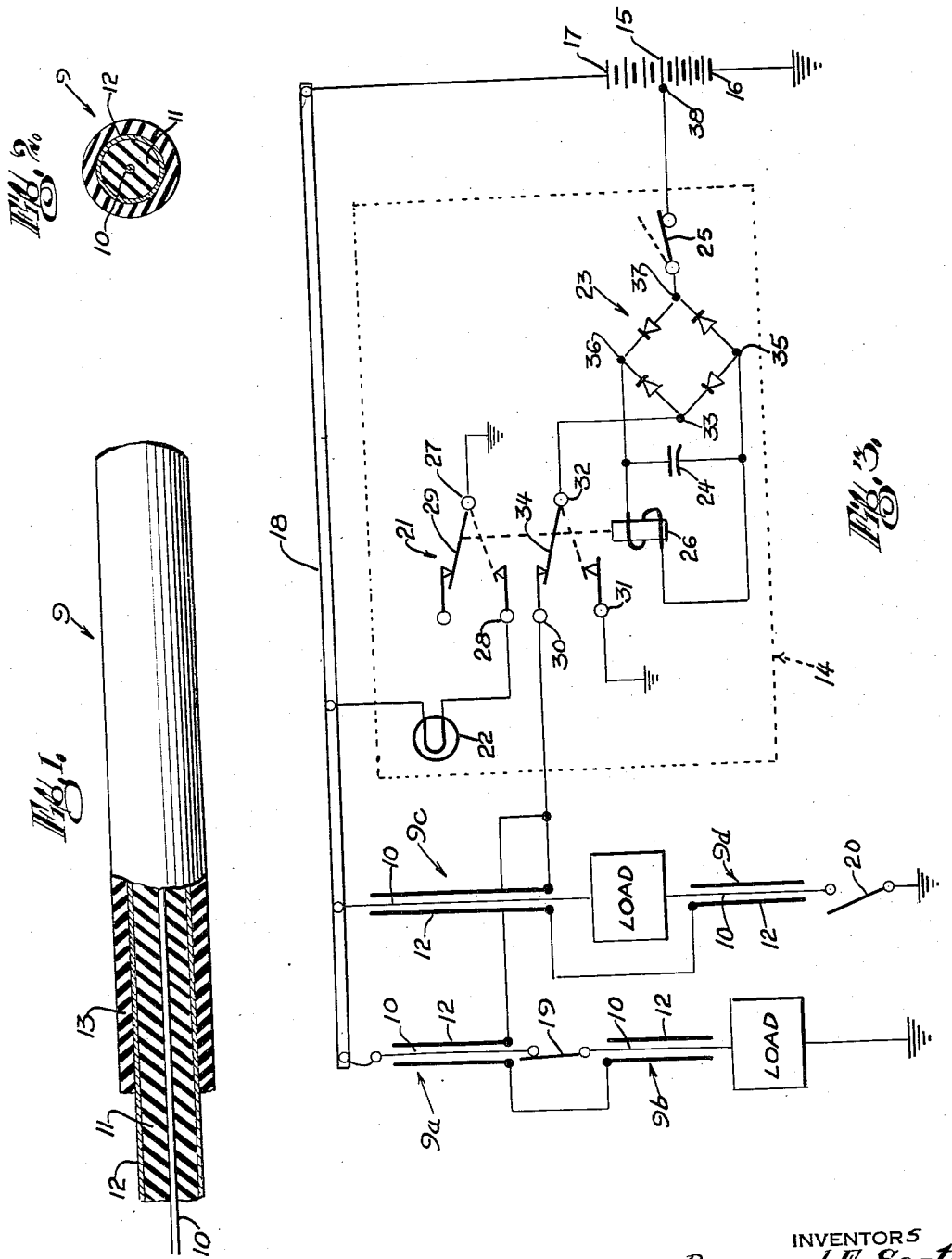
INVENTORS
Raymond E. Scott
Robert G. Towle
BY J. William Carson
ATTORNEY

2,792,568

Patented May 14, 1957

2,792,568

NETWORK FOR DETECTING THE FAILURE OF THE INSULATION OF ELECTRICALLY CONDUCTIVE CABLES

Raymond E. Scott, Lincoln Park, N. J., and Robert G. Towle, Summit Hills, New City, N. Y., assignors to Specialties Development Corporation, Belleville, N. J., a corporation of New Jersey Application March 4, 1955, Serial No. 492,156

8 Claims. (Cl. 340—255)

The present invention relates to a network for detecting the failure of the insulation of electrically conductive cables adapted for use in a system for supplying electrical current to various components herein referred to as the load; and, more particularly, the present invention is concerned with the improvement of systems such as illustrated in United States Patent No. 2,752,590.

Accordingly, an object of the present invention is to provide a short circuit detecting network, including indicating means, which can be assembled as a small compact unit adapted for connection in the current supplying system in a simple, convenient and practical manner.

Another object is to provide such a network wherein provision is made for locking in an indicating means controlling relay without unduly complicating the network or materially increasing the cost thereof.

Another object is to provide such a network wherein the relay can be reset manually at will.

Another object is to provide such a network for readily detecting the failure of either internal or external insulation of the cable regardless of the manner in which the cable connects the load to the supply of current.

A further object is to provide such a network which may be utilized over a wide range of loads.

A still further object is to provide such a network adapted to be utilized in connection with a plurality of cables connected in parallel.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purpose of illustration and description, and is shown in the accompanying drawing, forming a part of the specification, wherein:

Fig. 1 is an enlarged fragmentary view, partly in elevation and partly in longitudinal section, illustrating a cable adapted to be monitored to detect the failure of the insulation thereof.

Fig. 2 is a sectional view taken along the line 2—2 on Fig. 1.

Fig. 3 is a schematic wiring diagram of a system for supplying electrical current to a load, which system embodies a network in accordance with the present invention.

Referring to the drawing in detail and more particularly to Figs. 1 and 2 thereof, a small portion of a cable 9 is shown which may be of any desired length. This cable comprises an electrically conductive wire or main conductor 10, insulation 11 covering the wire 10 (referred to herein as the internal insulation), an electrically conductive shield 12 surrounding the internal insulation 11, and insulation 13 covering the shield 12 (referred to herein as the external insulation).

The main conductor or wire is illustrated as a single strand of circular cross-section, although it will be understood that it may be composed of a plurality of twisted or braided strands or may be in the form of a conductive tube or a flat strip, the essential feature being that it serves as a conductor of electricity to supply electrical energy from a source to a load.

The shield 12 is illustrated as being cylindrical, although it may have any conventional cross-sectional shape other than circular, depending on the desired cross-sectional shape of the cable. The shield may be a thin tube, imperforate or perforate or may be woven or braided of a plurality of conductive wire strands to provide a tube constructed of wire mesh. Here again, the essential feature is that the shield is electrically conductive so that failure of the internal insulation 11 establishes an electrical connection between the main conductor 10 and the shield 12 and that failure of the external insulation 13 enables the shield 12 to be grounded.

In Fig. 3, a system for supplying electrical energy to a load is shown which includes a short circuit detecting network 14 and a source 15 of electrical energy provided with conventional means for dividing the potential thereof.

In order to simplify the wiring diagram illustrating this system, the cable is illustrated schematically with only the main conductor 10 and the shield 12 being shown.

The network 14 is adapted to monitor one or more load supply lines, two such lines being shown to illustrate that the load may be connected in the supply line in various ways.

In one of these lines, a section of cable 9a has one end of its main conductor 10 connected to the positive side 17 of the source through a bus 18 and has the other end of its main conductor connected to one terminal of a switch 19; and a section of cable 9b has one end of its main conductor 10 connected to the other terminal of the switch and has the other end of its main conductor connected to one terminal of a load which has its other terminal connected to the ground, the shields 12 of the cable sections being in electrical connection.

In the other of these lines, a load is connected between sections of cable 9c and 9d, with the main conductor 10 of the former connected to the bus 18 and the main conductor 10 of the latter connected to the ground through a switch 20.

The network 14 essentially includes a relay 21, indicating means 22 such as a lamp, and a bridge-type rectifier 23, and, in addition to render the network more effective and practical, includes a condenser 24 and a relay resetting switch 25. These components are available in small sizes and lend themselves to be packaged as a very small and compact unit which occupies less than about 4 cubic inches of space and weighs less than about 8 ounces.

More specifically, the relay 21 includes a solenoid 26, a switch having a terminal 27 connected to ground and a terminal 28 connected to the bus 18 through the indicating means 22 and a switch member 29 operable by the solenoid 26 to establish an electrical connection between the terminals 27 and 28, and a second switch having a terminal 30 connected to the shields 12 of the cables and a contact or terminal 31 connected to ground and a terminal 32 connected to a terminal 33 of the rectifier and a switch member 34 normally connecting the terminals 30 and 32 and operable by the solenoid 26 to establish a connection between the terminals.

The solenoid terminals are connected across terminals 35 and 36 of the rectifier, and the condenser 24 is connected across the solenoid terminals. A fourth terminal 37 of the rectifier is connected through the switch 25 to the source 15 at an intermediate tap 38 in a conventional manner whereby only a fraction, for example half, of the potential of the source is supplied to the rectifier, and thus completing the network.

In operation, with the switches 19, 20 and 25 closed and the switch members 29 and 34 in their normal positions as shown in full lines, should the insulation 11 fail and contact be established between the main conductor 10 and the shield 12, current will flow from 17 to 18 to 10 to 12 to 30 to 32 to 33 to 36 through the solenoid 26 to 35 to 37 to 38, whereby the solenoid 26 is energized to operate the relay. Electrical current now will flow from 17 to 18 through the indicating means to 28 through the switch member 29 (now in its broken line position) to 27 to ground (source side 16) and effect operation of the indicating means.

With the switches and switch members in their normal positions, should the insulation 13 fail and the shield 12 be grounded, current will flow from 38 to 37 to 36 through the solenoid 26 to 35 to 33 to 32 to 30 to 12 to ground (source side 16), whereby the solenoid is energized to operate the relay. Electrical current now will flow from 17 to 18 through the indicating means to 28 through the switch member 29 (now again in its broken line position) to 27 to ground (source side 16) and effect operation of the indicating means.

In both cases of insulation failure just described, the relay 21, upon being operated to cause the switch member 34 to establish a connection between the terminals 31 and 32 as shown in broken lines, is locked in its operated position to cause the indicating means 22 to remain energized by current flowing from 38 to 37 to 36 through the solenoid 26 to 35 to 32 through 34 to 31 to ground (source side 16).

It will be noted that in all cases of relay operation, the current flows through the solenoid in the same direction due to the rectifier arrangement whereby locking in of the relay is assured. Also, in all cases of relay operation the condenser functions to maintain the solenoid energized even if the conductor 10 and the shield 12, or the shield 12 and ground, or the switch member 34 and terminal 31 only momentarily establish a circuit through the solenoid. Preferably, the relay is of the highly sensitive, low wattage type to insure fast action and low power consumption when locked in.

Furthermore, in both cases of insulation failure, detecting current ceases to flow through the main conductor 10 and/or the shield 12 because the connection between the terminals 30 and 32 is broken by movement of the switch member 34 to its broken line position upon relay operation, whereby an unnecessary drain on the source is prevented by a short circuit condition.

When the indicating means have responded to an insulation failure and the source of failure has been detected and corrected to remedy the short circuit condition, the relay 21 can be reset simply by opening the switch 25 as shown in broken lines, whereby the solenoid is de-energized and permits the relay switch members 29 and 34 to return to their normal positions under the influence of a conventional return spring (not shown).

From the foregoing description, it will be seen that the present invention provides a simple, practical and economical network and system for detecting insulation failure which is positive and reliable in operation and does not require frequent maintenance or repair.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a network for detecting the failure of the insulation of a cable including a main conductor adapted for connection across a source of electrical energy having one side connected to ground and an electrically conductive shield insulated from the main conductor and from ground, the combination of a relay including a solenoid, a first switch having a first terminal for connection to one side of a source of electrical energy and a second terminal and a member operable by said solenoid to establish an electrical connection between said terminals, and a second switch having a first terminal for connection to the shield and a second terminal and a member establishing an electrical connection between said terminals operable by said solenoid to break the connection; indicating means having a terminal electrically connected to said second terminal of said first switch and a second terminal for connection to the main conductor; and a bridge-type rectifier having one leg connected across said relay solenoid and having one terminal of its other leg connected to the second terminal of said second switch and the other terminal of the last mentioned leg being adapted for connection to an intermediate tap on the source of electrical energy.

2. A network according to claim 1, wherein the relay is of the high sensitive, low wattage type, and a condenser is connected across said relay solenoid.

3. A network according to claim 1, wherein the second switch includes a contact for connection to the first mentioned side of the source of electrical energy normally electrically disconnected from said second switch member and adapted to be engaged by said second switch member to establish an electrical connection upon operation of said relay solenoid.

4. A network according to claim 3, wherein a normally closed switch controls the connection of the last mentioned terminal of said rectifier with the last mentioned side of the source of electrical energy and said switch is operable at will to effect de-energization of said relay solenoid to reset the relay.

5. In a system of the class described, the combination of a source of electrical energy having a predetermined potential across its positive and negative sides and having one side connected to ground; a cable including a main conductor in electrical connection across the full potential of said source and an electrically conductive shield insulated from the main conductor and from ground, a load connected in said conductor, a relay including a solenoid, a first switch having a first terminal connected to the negative side of said source and a second terminal and a member operable by said solenoid to establish an electrical connection between said terminals, and a second switch having a first terminal connected to said shield and a second terminal and a member establishing an electrical connection between said terminals operable by said solenoid to break the connection; indicating means having a terminal electrically connected to said second terminal of said first switch and a second terminal connected to said main conductor; a bridge-type rectifier having one leg connected across said relay solenoid and having one terminal of its other leg connected to the second terminal of said second switch; and means connecting the other terminal of the last mentioned leg to said source of electrical energy to supply only a fraction of the potential of said source to said rectifier and said solenoid.

6. A system according to claim 5, wherein said second switch includes a contact connected to the negative side of said source normally disconnected from said second switch member and adapted to be engaged by said second member to establish an electrical connection upon operation of said relay solenoid to maintain said solenoid energized.

7. A system according to claim 6, wherein said last mentioned means include a normally closed switch adapted to be operated at will to effect de-energization of said relay solenoid to reset the relay.

8. In a system of the class described, the combination of a source of electrical energy having a predetermined potential across its positive and negative sides and having one side connected to ground; a plurality of cables each including a main conductor in electrical connection across the full potential of said source and an electrically conductive shield insulated from the main conductor and from ground, a load connected in each of said conductors, a relay including a solenoid, a first switch having a first terminal connected to the negative side of said source and a second terminal and a member operable by said solenoid to establish an electrical connection between said terminals, and a second switch having a first terminal connected to said shields and a second terminal and a member establishing an electrical connection between said terminals operable by said solenoid to break the connection; indicating means having a terminal electrically connected to said second terminal of said first switch and a second terminal connected to said main conductors; a bridge-type rectifier having one leg connected across said relay solenoid and having one terminal of its other leg connected to the second terminal of said second switch; and means connecting the other terminal of the last mentioned leg to said source of electrical energy to supply only a fraction of the potential of said source to said rectifier and said solenoid.

References Cited in the file of this patent

UNITED STATES PATENTS

| | | |
|---|---|---|
| 2,360,288 | Stevens et al. | Oct. 10, 1944 |
| 2,700,125 | King et al. | Jan. 18, 1955 |